Aug. 14, 1962 B. L. SNAVELY 3,049,678

OSCILLATOR

Original Filed March 3, 1948

INVENTOR.
B. L. SNAVELY

BY

O. Baxter Warner
D. Hodges

ATTORNEYS.

United States Patent Office 3,049,678 Patented Aug. 14, 1962

3,049,678
OSCILLATOR

Benjamin L. Snavely, Takoma Park, Md.

Original application Mar. 3, 1948, Ser. No. 12,843, now Patent No. 3,028,757, dated Apr. 10, 1962. Divided and this application June 24, 1957, Ser. No. 673,995
3 Claims. (Cl. 331—168)
(Granted under Title 35, U.S. Code (1952), sec. 266)

This invention may be manufactured and used by or for the Government of the United States of America for governmental purposes without the payment of any royalties thereon or therefor.

This is a divisional application of application for "Electrical Bridge Measuring Apparatus," Serial No. 12,843 filed March 3, 1948 by the same inventor, and relates to an oscillator. More particularly the oscillator of the present invention provides a source of very stable oscillations for applications where stability of the oscillation is of critical importance.

The oscillator of the present invention has a frequency control circuit connected to a push-pull feedback circuit. The output of the push-pull circuit is fed back to the control circuit by way of a voltage limiter circuit.

It is an object of this invention to provide an oscillator having a high degree of stability.

Other objects and many of the attendant advantages of this invention will be appreciated readily as the same becomes understood by reference to the following detailed description, when considered in connection with the accompanying drawings wherein.

Figure 1:
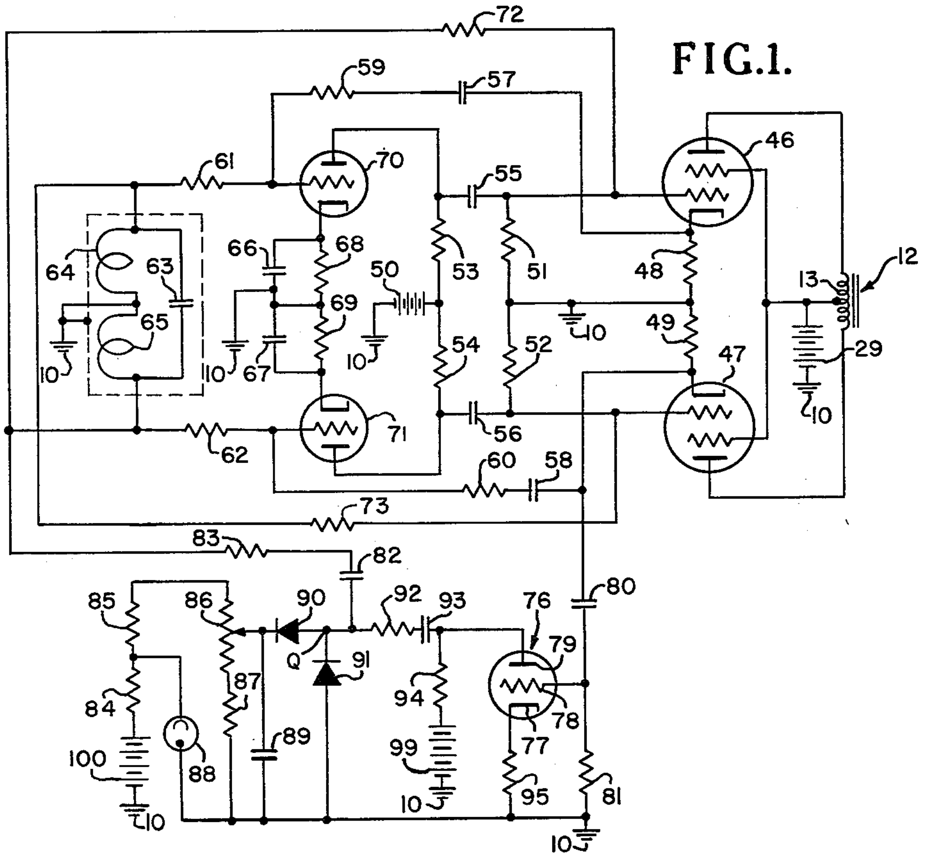
FIG. 1 is a schematic drawing of the novel oscillator.

A stabilized oscillator comprising electron discharge tubes 70, 71, 46, 47, and 76 and associated components is illustrated in FIG. 1.

The frequency controlling L-C circuit of the aforementioned oscillator includes a center tapped inductor comprising inductances 64 and 65 connected together in series, and having the junction therebetween grounded at 10. Connected across the two inductors 64 and 65 is a tuning capacitor 63, one terminal of capacitor 63 being connected by way of resistor 61 to the control grid of oscillator tube 70, which may be a triode of any convenient type. The other terminal of capacitor 63 is connected by way of resistor 62 to the control grid of tube 71, which may be a triode of a type similar to tube 70.

The cathode of tube 70 is connected through resistor 68 to ground, resistor 68 having a by-pass capacitor 66 connected in parallel therewith, and the cathode of tube 71 is connected through resistor 69 to ground, resistor 69 having a by-pass capacitor 67 connected in parallel therewith.

The anodes of tubes 70 and 71 are connected to load resistors 53 and 54 respectively, which have the other ends thereof connected together and to the positive terminal of a battery 50, which has the negative terminal thereof connected to ground.

The anode of tube 70 is connected by way of coupling capacitor 55 to the control grid of electron discharge tube 46, which may be of any convenient type, in the embodiment shown and described herein, a tetrode. Similarly, the anode of tube 71 is connected by coupling capacitor 56 to the control grid of tube 47, which is preferably of a type similar to tube 46. The control grids of tubes 46 and 47 are connected to ground through resistors 51 and 52 respectively, and the cathodes of tubes 46 and 47 are connected to ground through resistors 48 and 49 respectively. The cathode of tube 46 is further connected through capacitor 57 in series with resistor 59 to the grid of tube 70, and the cathode of tube 47 is connected through capacitor 58 in series with resistor 60 to the control grid of tube 71.

The control grid of tube 46 is connected by way of resistor 72 to inductor 65, while the control grid of tube 47 is connected by way of resistor 73 to inductor 64.

The screen grids of tubes 46 and 47 are connected together and to the positive terminal of battery 29 which has the negative terminal thereof grounded at 10. The anode of tube 46 is connected to one end of primary 13, while the other end of primary 13 is connected to the anode of tube 47. The center tap of the primary 13 is connected to the aforementioned positive terminal of battery 29.

A regulator channel is provided, including tube 76, which may be a triode of any convenient type, having the control grid 78 thereof connected by way of capacitor 80 to the cathode of tube 47, the control grid 78 also being connected by way of resistor 81 to ground 10.

The cathode 77 of tube 76 is connected by way of resistor 95 to ground. The anode 79 of tube 76 is connected by way of resistor 94 to the positive terminal of battery 99 which has the negative terminal thereof connected to ground. Anode 79 is further connected by way of capacitor 93, resistor 92, capacitor 82, and resistor 83, connected in series in the order named, to inductor 65. The junction between resistor 92 and capacitor 82 is connected to a pair of rectifiers 90 and 91. The other terminal of rectifier 91 is connected to ground 10, and the other terminal of rectifier 90 is connected by way of capacitor 89 to ground 10.

The junction between capacitor 89 and rectifier 90 is connected to the center arm of a potentiometer 86 which has one terminal thereof connected by way of resistor 87 to ground, and which has the other terminal thereof connected to one end of resistor 85, the other end of resistor 85 being connected to one terminal of gaseous discharge tube 88, the other terminal of the gaseous discharge tube 88 being connected to ground. The junction between resistor 85 and tube 88 is connected by way of resistor 84 to the positive terminal of battery 100, the other terminal of the battery 100 being connected to ground at 10.

Figure 2:
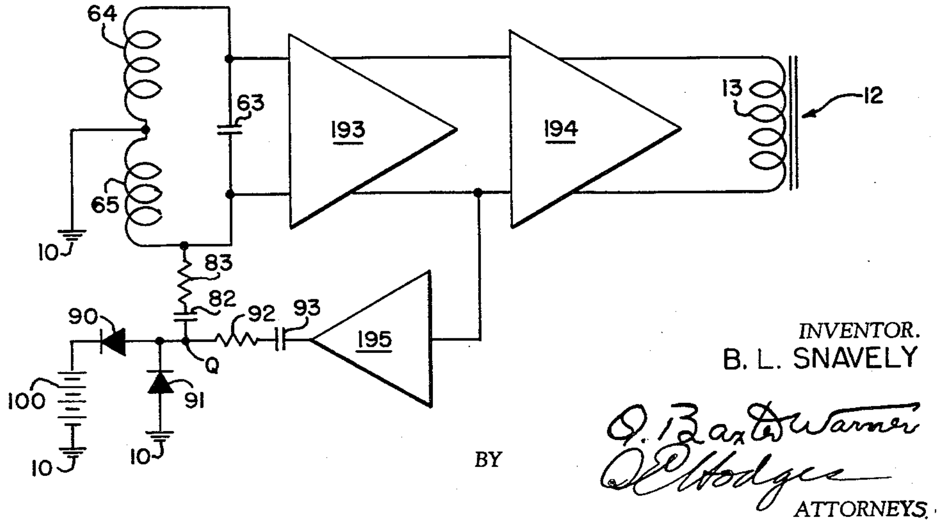
FIG. 2 is a block diagram of said oscillator.

The operation of the above traced oscillator circuit may best be understood by reference to FIG. 2, in which is shown a simplified diagram thereof, the amplifier stage 193 thereof comprising tubes 70 and 71 of FIG. 1, the amplifier stage 194 thereof comprising tubes 46 and 47 of FIG. 1, and the amplifier stage 195 including tube 76 of FIG. 1.

The oscillator of FIG. 2 comprises a frequency selective network including inductors 64 and 65 and capacitor 63, which is connected to the amplifier 193 which is preferably designed to be substantially linear in its amplifying characteristics. The output of amplifier 193 is fed to two amplifiers, the buffer amplifier 194 which feeds the primary 13 of bridge transformer 12, and a feedback amplifier 195. Both amplifiers 193 and 194 are stabilized by inverse feedback, in a manner to be subsequently more fully described in connection with FIG. 1. The output of amplifier 195 is connected by way of aforementioned capacitor 93, resistor 92, capacitor 82, and resistor 83, to the frequency controlling network. Capacitors 82 and 93 are blocking capacitors which isolate the D.-C. potentials in the various parts of the circuit. Their capacitative reactances are preferably small compared to the impedances of the circuits in which they operate.

The junction Q between resistor 92 and capacitor 82 is connected to ground through rectifier 91 and also to ground through rectifier 90 and battery 100, the impedance of which is preferably small. The rectifiers, which may be of the copper oxide or any other convenient type, conduct current unidirectionally, for example, in the direction indicated by the arrows of the rectifiers. Battery 100 is of a polarity to oppose the flow of current in this direction.

In the operation of the circuit of FIG. 2, if the potential of point Q rises above the potential of battery 100, current flows through rectifier 90 and battery 100 to ground, while if the potential at point Q falls below ground potential, current flows through rectifier 91. The impedances presented to point Q by resistor 92 in series with the output impedance of amplifier 195, and the impedance presented to point Q by resistor 83 in series with the tuned circuit 63—65, are made high by choice of component values, and as a result, the rectifiers 90 and 91 effectively limit the extreme potentials at point Q. After the signal in the feedback channel attains a predetermined level, a further increase in the signal supplied to amplifier 195 produces slight, if any, additional excitation of the tuned circuit. Accordingly, the tuned circuit is excited at substantially a constant level. As the shape of the voltage variation at Q approaches a square wave, the excitation of amplifier 193 becomes more nearly constant.

Referring again to FIG. 1, some additional refinements over the circuit arrangement of FIG. 2 are provided. The network of resistors 84, 85, 87, and potentiometer 86 permits adjustment of the operating voltage at point Q of the circuit, while the gaseous discharge tube 88 provides additional voltage regulation for the point at which it is connected. Also, it is noted that cathode resistors 48 and 49 are unbypassed to provide some degeneration and stabilization, and that inverse feedback is provided by the aforementioned lead connection including capacitor 57 and resistor 59 between the cathode of tube 46 and control grid of tube 70, and the lead connection including capacitor 58 and resistor 60 between the cathode of tube 47 and the control grid of tube 71. Cathode resistor 49 also provides coupling for securing a voltage for application to tube 76, and the use of the unbypassed cathode resistors 48 and 49 result in a high impedance presented to primary 13, with resultant increase in the stability and sensitivity of operation of the bridge. By properly proportioning the resistors 72 and 73 with respect to resistors 51 and 52 respectively, the output of the oscillator may be made nearly independent of the heater voltages applied to the tubes 70, 71, 46, and 47.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An oscillator comprising, in combination, a split inductance tuned circuit having the center point of the inductance maintained at ground potential, a first pair of electron discharge tubes each having an anode, control grid, and cathode, resistive electrical connections between the control grids and the ends of said inductance respectively, circuit means including a source of anode potential connected between both said anodes and both said cathodes and having a point therein maintained at ground potential, a second pair of electron discharge tubes each having an anode, cathode, and control grid, a pair of coupling devices connected between the anodes of said first pair of tubes and the grids of said second pair of tubes respectively, biasing means for said second pair of tubes, a utilization circuit including a source of anode potential connected to the anodes of said second pair of electron discharge tubes, a pair of decoupling circuit devices connected between the control grids of said first pair of tubes and the cathodes of said second pair of tubes respectively, resistive connections between the control grids of said second pair of tubes and the respective ends of said inductance, and feedback means including a feedback amplifier intercoupling said second pair of electron discharge tubes and said tuned circuit.

2. An oscillator comprising a frequency determinative tuned network, a first pair of electron tubes arranged in a push-pull amplifier configuration, a first pair of resistances, each of which interconnects one end of said tuned network with the control grid of one of said first pair of tubes, a second pair of electron tubes arranged in a push-pull amplifier configuration, a pair of R-C coupling networks, each of which interconnects the anode of one of said first pair of tubes and the control grid of one of said second pair of tubes, a pair of R-C inverse feedback networks, each of which interconnects the control grid of said one of the tubes of said first pair of tubes to the cathode of said one of the tubes of said second pair of tubes, a second pair of resistances, each of which interconnects the control grid of one of said second pair of tubes and the end of said tuned network coupled to the control grid of the other one of said first pair of tubes, and a regenerative feedback circuit coupled between the cathode of one of said second pair of tubes and one end of said tuned network, said feedback circuit including means for selectively adjusting the operating level of said feedback circuit, and means for regulating the magnitude of the feedback energy correlative to the operating level of said feedback circuit.

3. An oscillator comprising a frequency determinative network including a parallel connected condenser and inductance, the center of said inductance being maintained at ground potential, a first pair of electron tubes each having at least an anode, cathode, and control grid, a pair of parallel coupled resistance and capacitance networks, each of which is disposed between the cathode of one of said first pair of tubes and ground potential, a pair of resistances each of which interconnects one end of said frequency determinative network and the control grid of one of said first pair of tubes, an output circuit coupled between the anodes of said first pair of tubes, said output circuit including a pair of serially connected resistors and a potential energy source, a second pair of electron tubes each having at least an anode, cathode, and control grid, a pair of serially coupled resistances interconnecting the cathodes of said second pair of tubes, the juncture of said last recited pair of serially coupled resistances being maintained at ground potential, a pair of R-C coupling networks, each of which interconnects the anode of one of said first pair of tubes and the control grid of one of said second pair of tubes, an output circuit coupled between the anodes of said second pair of tubes, said last recited output circuit including a transformer winding and a potential energy source, a pair of R-C inverse feedback networks each of which interconnects the cathode of the one of said second pair of tubes and the control grid of the one of said first pair of tubes interconnected by one of said R-C coupling networks, a pair of resistance paths each of which interconnects the control grid of one of said second pair of tubes and the end of said frequency determinative network coupled to the control grid of the one of said first pair of tubes connected to the other one of said second pair of tubes by one of said R-C coupling networks, and feedback circuit means for effecting excitation of said frequency determinative network, said feedback circuit means including an amplifier stage having an electron tube, means for coupling the control grid of said last recited tube to the cathode of one of said second pair of tubes, means for coupling the anode of said last recited tube to one end of said frequency determinative network, an amplitude limiting network coupled to said amplifier stage for regulating the level of the feedback energy to said frequency determinative network, and a potential energy divider network for selectively adjusting the level of operation of said amplitude limiting network.

References Cited in the file of this patent

UNITED STATES PATENTS

| | | |
|---|---|---|
| 2,318,061 | Dailey | May 4, 1943 |
| 2,451,021 | Detuno | Oct. 12, 1948 |